United States Patent
Yoshida et al.

(10) Patent No.: US 7,709,413 B2
(45) Date of Patent: May 4, 2010

(54) SOLID CATALYSTS AND FUEL CELL EMPLOYING THE SOLID CATALYSTS

(75) Inventors: Takashi Yoshida, Kashiwa (JP); Satoshi Itoh, Omitama (JP); Fumihiko Aiga, Yokohama (JP); Yoshiko Hiraoka, Kawasaki (JP); Reiko Yoshimura, Kawasaki (JP); Tsukasa Tada, Hachioji (JP); Yasutaka Nishida, Fuchu (JP)

(73) Assignee: Kabuhsiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/323,577

(22) Filed: Nov. 26, 2008

(65) Prior Publication Data

US 2009/0137388 A1    May 28, 2009

(30) Foreign Application Priority Data

Nov. 26, 2007  (JP)  ............... P2007-304574
Sep. 9, 2008   (JP)  ............... P2008-230747

(51) Int. Cl.
- *B01J 23/00*  (2006.01)
- *B01J 23/40*  (2006.01)
- *B01J 23/42*  (2006.01)
- *B01J 23/44*  (2006.01)

(52) U.S. Cl. ............... 502/313; 502/326; 502/339
(58) Field of Classification Search ............... 502/313, 502/326, 339; 420/82, 462, 466
See application file for complete search history.

(56) References Cited

U.S. PATENT DOCUMENTS

| | | | | |
|---|---|---|---|---|
| 3,437,525 A | * | 4/1969 | Hauel et al. ............... | 429/34 |
| 4,126,934 A | * | 11/1978 | Richter et al. ............... | 29/623.1 |
| 5,954,928 A | * | 9/1999 | Kishi et al. ............... | 204/290.08 |
| 6,040,077 A | * | 3/2000 | Debe et al. ............... | 429/40 |
| 6,663,998 B2 | * | 12/2003 | Nørskov et al. ............... | 429/40 |
| 7,001,865 B2 | * | 2/2006 | Tada et al. ............... | 502/185 |
| 7,125,822 B2 | * | 10/2006 | Nakano et al. ............... | 502/339 |
| 7,192,670 B2 | * | 3/2007 | Daimon et al. ............... | 429/40 |
| 7,205,255 B2 | * | 4/2007 | Yamamoto ............... | 502/101 |
| 2005/0053826 A1 | * | 3/2005 | Wang et al. ............... | 429/44 |
| 2006/0093892 A1 | * | 5/2006 | Min et al. ............... | 429/40 |

(Continued)

FOREIGN PATENT DOCUMENTS

JP    2001-76742    3/2001

(Continued)

OTHER PUBLICATIONS

Hubert A. Gasteiger et al., "CO Electrooxidation on Well-Characterized Pt-Ru Alloys," The Journal of Physical Chemistry, 98:2, 1994, pp. 617-625.

(Continued)

*Primary Examiner*—Cam N Nguyen
(74) *Attorney, Agent, or Firm*—Finnegan, Henderson, Farabow, Garrett & Dunner, L.L.P.

(57) ABSTRACT

A solid catalyst has a close-packed structure and has a first surface layer and a second surface layer, wherein the first surface layer includes platinum as a main component and the second surface layer contains $Pt_aX_b$ (wherein X is one element selected from the group consisting of Zr, Hf, Nb, Ta, Mo, and W; a+b=100; and $25 \leq b \leq 50$); and a fuel cell includes the solid catalyst as an anode-side electrode catalyst.

9 Claims, 1 Drawing Sheet

U.S. PATENT DOCUMENTS

| | | | |
|---|---|---|---|
| 2006/0172179 A1* | 8/2006 | Gu et al. | 429/44 |
| 2006/0228603 A1* | 10/2006 | Daimon et al. | 429/30 |
| 2006/0263675 A1* | 11/2006 | Adzic et al. | 429/44 |
| 2007/0031722 A1* | 2/2007 | Adzic et al. | 429/44 |
| 2007/0105005 A1* | 5/2007 | Tolmachev | 429/44 |

FOREIGN PATENT DOCUMENTS

| | | |
|---|---|---|
| JP | 2003-80077 | 3/2003 |
| JP | 2003-157857 | 5/2003 |
| JP | 2004-527086 | 9/2004 |
| JP | 2005-501177 | 1/2005 |
| JP | 2007-35489 | 2/2007 |
| JP | 2007-220654 | 8/2007 |

OTHER PUBLICATIONS

S. Wasmus et al., "Methanol Oxidation and Direct Methanol Fuel Cells: A Selective Review," Journal of Electroanalytical Chemistry 461, 1999, pp. 14-31.

* cited by examiner

SOLID CATALYSTS AND FUEL CELL EMPLOYING THE SOLID CATALYSTS

CROSS-REFERENCE TO RELATED APPLICATIONS

This application is based upon and claims the benefits of priorities from the prior Japanese Patent Application No. 2007-304574 filed on Nov. 26, 2007 and the prior Japanese Patent Application No. 2008-230747 filed on Sep. 9, 2008, the entire contents of which are incorporated herein by reference.

BACKGROUND OF THE INVENTION

1. Field

The present invention relates to solid catalysts and a fuel cell.

2. Description of Related Art

Solid polymer type fuel cells, which are characterized by having a high power density, are known as one kind of fuel cells. Of these, direct-methanol fuel cells (DMFCs), which are preferable for size reduction, are being developed enthusiastically.

The reactions occurring on the anode side in a direct-methanol fuel cell (DMFC) are methanol decomposition reactions which proceed in steps on the surface of the metal catalyst. Namely, an anode reaction represented by the following scheme 1 proceeds on the anode side.

(scheme 1)

$$CH_3OH + H_2O \longrightarrow 6H^+ + 6e^- + CO_2$$

The carbon dioxide generation reaction which is the final step in this anode reaction is one of the reaction-rate-determining steps. The fact that this step is a rate-determining step is generally known to be attributable to "carbon monoxide poisoning" in which the carbon monoxide generated by the proton elimination reaction of the methanol as a fuel is tightly adsorbed onto the platinum surface to thereby reduce the catalytic activity.

In this connection, it is known that the value of active current is greatly improved by replacing the platinum catalyst with a platinum-ruthenium alloy catalyst. This improvement is thought to be attained by the following mechanism. The carbon monoxide generated on the platinum surface is rapidly oxidized by the ruthenium, which has the higher ability to oxidize carbon monoxide than platinum. Because of this, the carbon monoxide poisoning of the platinum surface, which is important for the methanol decomposition reaction, is reduced (see H. A. Gasteiger, N. Markovic, P. N. Ross, E. J. Cairns, *J. Phys. Chem.*, 98, 617 (1994) and S. Wasmus and A. Kuver, *J. Electroanal. Chem.*, 461, 14 (1999)).

Many attempts have been made to improve catalytic activity and heighten the value of active current by reducing the carbon monoxide poisoning of platinum in a higher degree than in the case of using a platinum-ruthenium alloy catalyst.

One of approaches to the poisoning reduction is a "multinary alloy catalyst" obtained by adding one or more other elements to a platinum-ruthenium alloy. However, since there is no clear guideline for design in catalyst composition screening, the method in general use is to experimentally investigate each of many catalyst compositions.

On the other hand, besides composition, it is important to regulate a surface structure so as to have high activity in a desired reaction. However, there are few patent documents concerning a technique for positively controlling the surface structure of an electrode catalyst.

JP-A 2003-157857 (KOKAI) proposes a fuel cell cathode (air electrode) which has a catalyst surface including a large proportion of exposed platinum (001) faces, which have higher activity, to thereby have improved activity. JP-A 2007-220654 (KOKAI) proposes an anode which has a catalyst-alloy surface including exposed (100) faces, (010) faces, and (001) faces to thereby have improved catalytic activity as in the technique described above.

However, in the case of the platinum-ruthenium alloy catalyst containing one or more additional elements, the correlation between the state of distribution of the atoms in the catalyst surface and catalytic activity is not clear.

As described above, the conventional solid catalysts for use in direct-methanol fuel cells (DMFCs) have had a problem concerning carbon monoxide poisoning.

BRIEF SUMMARY OF THE INVENTION

The invention may provide, according to a first example of the embodiments thereof, a solid catalyst having a close-packed structure and having a first surface layer and a second surface layer, the first surface layer including platinum as a main component and the second surface layer containing $Pt_aX_b$, wherein X is one element selected from the group consisting of Zr, Hf, Nb, Ta, Mo, and W, a+b=100, and 25≦b≦50.

The invention may provide, according to a second example of the embodiments thereof, a solid catalyst having a close-packed structure and having a first surface layer and a second surface layer, the first surface layer including platinum and ruthenium as main components and the second surface layer containing $Pt_aRu_bX_c$, wherein X is one element selected from the group consisting of Zr, Hf, Nb, Ta, Mo, and W, a+b+c=100, and 25≦c≦50.

The invention may provide, according to a third example of the embodiments thereof, a solid catalyst having a close-packed structure and having a first surface layer and a second surface layer, wherein the first surface layer includes lattices appearing therein which each contain four atoms of metallic elements and which have a minimum unit containing platinum and ruthenium in a platinum/ruthenium ratio of 3/1, and the second surface layer contains $Pt_aRu_bX_c$, wherein X is one element selected from the group consisting of Ti, V, Cr, Zr, Hf, Nb, Ta, Mo, and W, a+b+c=100, and 25≦c≦50.

The invention furthermore may provide a fuel cell which includes the solid catalyst according to the first, second, or third example of the embodiments of the invention as an anode-side electrode catalyst.

According to the embodiments of the invention, solid catalysts having an excellent function which diminishes carbon monoxide poisoning and a fuel cell employing any of the solid catalysts are provided.

DETAILED DESCRIPTION OF THE INVENTION

Figure 1:
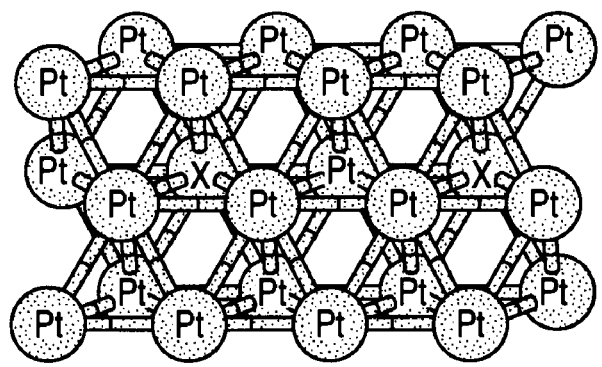
FIG. 1 is a diagrammatic view of a solid catalyst according to the first example of the embodiments of the invention.

Embodiments of the invention will be explained below by reference to the drawings. In the drawings, identical or like parts are designated by identical or like signs. It should, however, be noted that the drawings are diagrammatic and that the relationship between thickness and planar dimension, the proportion among the thicknesses of layers, etc. differ from actual ones. Consequently, specific thicknesses and dimensions must be judged in consideration of the following explanations. It is a matter of course that the drawings may include respective parts which differ from each other in dimensional relationship or proportion.

The embodiments shown below are intended to show apparatus and methods, as examples, for materializing technical ideas of the embodiments of the invention. The technical ideas of the embodiments should not be construed as limiting the material, shape, structure, arrangement, etc. of each constituent element to the following ones. The technical ideas of the embodiments can be variously modified within the scope of the claims.

First Example of Embodiments

The first example of the embodiments of the invention is explained below.

This solid catalyst is characterized in that the first surface layer thereof includes platinum as a main component and the second surface layer thereof contains $Pt_aX_b$, wherein X is one element selected from the group consisting of Zr, Hf, Nb, Ta, Mo, and W, a+b=100, and $25 \leq b \leq 50$.

The first surface layer of this solid catalyst, which has a close-packed structure, includes platinum as a main component. The term "main component" herein means that platinum is contained in an amount of at least 75 at. % based on the total number of all atoms in the first surface layer.

The additional element X in the second surface layer is one element selected from the group consisting of Zr, Hf, Nb, Ta, Mo, and W. It should, however, be noted that the second surface layer must be a platinum-based alloy layer in which the additional element X is contained in an amount of from 25 at. % to 50 at. % based on the total number of all atoms in the second layer.

When catalytic reactions are taken into account, the first surface layer necessitates four catalytic atoms at the lowest for enabling one molecule of carbon monoxide to coordinate to one oxygen atom to undergo oxidation reaction. Consequently, the 25 at. % shown as the lower limit has been set because the desired function is performed only when at least one atom under the four atoms in the first layer has been replaced by the additional element. The additional element herein means an element having a smaller number of d-electrons than platinum and ruthenium. In case where such an element has been added in an amount larger than 50 at. %, the first surface layer has a considerably reduced charge density. The upper limit of 50 at. % is a value set for the purpose of avoiding a decrease in reactivity due to a large decrease in surface charge density.

Of the additional elements shown above, zirconium, hafnium, niobium, and tantalum are permitted to be exposed in the outermost surface. However, molybdenum and tungsten are not preferable to be exposed. This is because the second layer functions as a "reaction-accelerating layer" which improves the CO-oxidizing ability of the first layer.

Additional elements for use in the second layer are elements having a smaller number of valence electrons than platinum and this changes the state of electrons in the platinum located in the first layer. This is an important point in the embodiment of the invention. Because of this, the additional elements usable in the second layer should not be construed as being limited to transition metals. For example, it is also preferred that hydrogen should be contained in the second layer in a proportion of from 200 at. % to 400 at. % based on the total number of atoms of the platinum in the second layer.

When catalytic reactions are taken into account, the first surface layer necessitates four catalytic atoms at the lowest for enabling one molecule of carbon monoxide to coordinate to one oxygen atom to undergo oxidation reaction. The 200 at. % shown as the lower limit has been set because a stable cluster capable of being stably present in the vacancy having Cd symmetry and formed under the four atoms in the first layer is one containing six hydrogen atoms. The upper limit of 400 at. % is a value set for the case where such clusters containing six hydrogen atoms are present at a two-fold higher density.

This solid catalyst can be produced by the following method. First, an alloy surface containing platinum and an element X in a Pt/X ratio of 3/1 is produced. Thereafter, the element X is dissolved away from the surface by electrolytic etching based on a difference in oxidation-reduction potential between platinum and the element X. The surface is then annealed to reconstitute a first layer made of platinum. Incidentally, the X is one element selected from the group consisting of Zr, Hf, Nb, Ta, Mo, and W. Through those steps, a structure is obtained in which the surface contains exposed platinum and the second layer and underlying layers are layers of an alloy of platinum and the element X.

Alternatively, the following method may be used. An alloy surface containing platinum and an element X in a Pt/X ratio of 3/1 is produced. Thereafter, a platinum target is used to form a first surface layer by sputtering. The element X is selected from the group consisting of Zr, Hf, Nb, Ta, Mo, and W.

Second Example of Embodiments

The second example of the embodiments of the invention is explained below. Incidentally, explanations on parts which are the same as in the first example of the embodiments are omitted.

The solid catalyst according to the second example of the embodiments of the invention is a solid catalyst having a close-packed structure and having a first surface layer and a second surface layer, and is characterized in that the first surface layer thereof includes platinum and ruthenium as main components and the second surface layer thereof contains $Pt_aRu_bX_c$, wherein X is one element selected from the group consisting of Zr, Hf, Nb, Ta, Mo, and W, a+b+c=100, and $25 \leq c \leq 50$.

The first surface layer of this solid catalyst, which has a close-packed structure, includes platinum and ruthenium as main components. The term "main components" herein means that platinum and ruthenium are contained in a total amount of at least 75 at. % based on the total number of all atoms in the first surface layer.

The additional element X in the second surface layer is one element selected from the group consisting of Zr, Hf, Nb, Ta, Mo, and W. It should, however, be noted that the second surface layer is a platinum-based alloy layer in which the additional element X is contained in an amount of from 25 at. % to 50 at. % based on the total number of all atoms in the second layer.

When catalytic reactions occurring on the first surface layer of the catalyst are taken into account, the first surface layer necessitates four catalytic atoms at the lowest for enabling a molecule of carbon monoxide to coordinate to an oxygen atom to undergo oxidation reaction. Consequently, the 25 at. % shown as the lower limit has been set because the desired function is performed only when at least one atom under the four atoms in the first layer has been replaced by the additional element. The additional element herein means an element having a smaller number of d-electrons than platinum and ruthenium. In case where such an element has been added in an amount larger than 50 at. %, the first surface layer has a considerably reduced charge density. The upper limit of 50 at. % is a value set for the purpose of avoiding a decrease in reactivity due to a large decrease in surface charge density.

Of the additional elements shown above, zirconium, hafnium, niobium, and tantalum are permitted to be exposed in the outermost surface. However, molybdenum and tungsten are not preferable to be exposed. This is because the second layer, in this case also, functions as a "reaction-accelerating layer" which improves the CO-oxidizing ability of the first layer.

Additional elements for use in the second layer are elements having a smaller number of valence electrons than platinum and this changes the state of electrons in the platinum located in the first layer. This is an important point in the embodiment of the invention. Because of this, the additional elements usable in the second layer should not be construed as being limited to transition metals. For example, it is also preferred that hydrogen should be contained in the second layer in a proportion of from 200 at. % to 400 at. % based on the total number of atoms of the platinum and ruthenium in the second layer.

When catalytic reactions are taken into account, the first surface layer necessitates four catalytic atoms at the lowest for enabling one molecule of carbon monoxide to coordinate to one oxygen atom to undergo oxidation reaction. The 200 at. % shown as the lower limit has been set because a stable cluster capable of being stably present in the vacancy having Cd symmetry and formed under the four atoms in the first layer is one containing six hydrogen atoms. The upper limit of 400 at. % is a value set for the case where such clusters containing six hydrogen atoms are present at a two-fold higher density.

This solid catalyst can be produced by the following method. First, an alloy surface containing platinum, ruthenium, and an element X in a (Pt+Ru)/X ratio of 3/1 is produced. Thereafter, the element X is dissolved away from the surface by electrolytic etching based on a difference between the oxidation-reduction potentials of platinum and ruthenium and that of the element X. The surface is then annealed to reconstitute a first layer made of platinum and ruthenium. Incidentally, the X is one element selected from the group consisting of Zr, Hf, Nb, Ta, Mo, and W. Through those steps, a structure is obtained in which the surface contains exposed platinum and ruthenium and the second layer and underlying layers are layers of an alloy of platinum, ruthenium, and the element X.

Alternatively, the following method may be used. An alloy surface containing platinum, ruthenium, and an element X in a (Pt+Ru)/X ratio of 3/1 is produced. Thereafter, a platinum-ruthenium alloy target (Pt/Ru ratio is from 3/1 to 1/1) is used to form a first surface layer by sputtering. Incidentally, the X is one element selected from the group consisting of Zr, Hf, Nb, Ta, Mo, and W. Through these steps, a structure is obtained in which the surface contains exposed platinum and ruthenium and the second layer and underlying layers are layers of an alloy of platinum, ruthenium, and the element X.

Third Example of Embodiments

The third example of the embodiments of the invention is explained below. Incidentally, explanations on parts which are the same as in the first or second example of the embodiments are omitted.

The solid catalyst according to the third example of the embodiments of the invention is a solid catalyst having a close-packed structure and having a first surface layer and a second surface layer, and is characterized in that the first surface layer includes lattices appearing therein which each contain four atoms of metallic elements and which have a minimum unit containing platinum and ruthenium in a platinum/ruthenium ratio of 3/1, and that the second surface layer contains $Pt_aRu_bX_c$. It is important that an element X which has a smaller number of valence electrons than the elements constituting the catalyst base should be incorporated to thereby change the state of electrons in the surface. Because of this, an element is selected which has a smaller number of valence electrons than the platinum and ruthenium constituting the alloy base, which have ten valence electrons and eight valence electrons, respectively. Specifically, X is one element selected from the group consisting of Ti, Zr, and Hf, which are elements each having four valence electrons, V, Nb, and Ta, which are elements each having five valence electrons, and Cr, Mo, and W, which are elements each having six valence electrons (a+b+c=100, $25 \leq c \leq 50$).

The first surface layer of this solid catalyst, which has a close-packed structure, includes platinum and ruthenium as main components. The term "main components" herein means that platinum and ruthenium are contained in a total amount of at least 75 at. % based on the total number of all atoms in the first surface layer.

With respect to atomic proportion between the platinum and ruthenium which are the main components appearing in the surface, the first surface layer contains platinum and ruthenium in a ratio of 3:1 when an arbitrary atom A and three atoms located closest thereto (atom B, atom C, and atom D) are selected so as to form a unit structure having a rhombic structure (p(2×2)).

The additional element X in the second surface layer is one element selected from the group consisting of Ti, V, Cr, Zr, Hf, Nb, Ta, Mo, and W. It should, however, be noted that the second surface layer is a platinum-based alloy layer in which the additional element X is contained in an amount of from 25 at. % to 50 at. % based on the total number of all atoms in the second layer.

When catalytic reactions occurring on the first surface layer are taken into account, the first surface layer necessitates four catalytic atoms at the lowest for enabling a molecule of carbon monoxide to coordinate to an oxygen atom to undergo oxidation reaction. Consequently, the 25 at. % shown as the lower limit has been set because the desired function is performed only when at least one atom under the four atoms in the first layer has been replaced by the additional element. The additional element herein means an element having a smaller number of d-electrons than platinum and ruthenium. In case where such an element has been added in an amount larger than 50 at. %, the first surface layer has a considerably reduced charge density. The upper limit of 50 at. % is a value set for the purpose of avoiding a decrease in reactivity due to a large decrease in surface charge density.

Of the additional elements shown above, zirconium, hafnium, niobium, tantalum, titanium, and vanadium are permitted to be exposed in the outermost surface. However, molybdenum, tungsten, and chromium are not permitted to be exposed. This is because the second layer, in this case also, functions as a "reaction-accelerating layer" which improves the CO-oxidizing ability of the first layer.

Additional elements for use in the second layer are elements having a smaller number of valence electrons than platinum and this changes the state of electrons in the first layer. This is an important point in the embodiment of the invention. Because of this, the additional elements usable in the second layer should not be construed as being limited to transition metals. For example, it is also preferred that hydrogen should be contained in the second layer in a proportion of from 200 at. % to 400 at. % based on the total number of atoms of the platinum and ruthenium in the second layer.

When catalytic reactions are taken into account, the first surface layer necessitates four catalytic atoms at the lowest for enabling one molecule of carbon monoxide to coordinate to one oxygen atom to undergo oxidation reaction. The 200 at. % shown as the lower limit has been set because a stable cluster capable of being stably present in the vacancy having Cd symmetry and formed under the four atoms in the first layer is one containing six hydrogen atoms. The upper limit of 400 at. % is a value set for the case where such clusters containing six hydrogen atoms are present at a two-fold higher density.

This solid catalyst can be produced by the following method. First, an alloy surface containing platinum, ruthenium, and an element X in a (Pt+Ru)/X ratio of 3/1 is produced. Thereafter, a platinum-ruthenium alloy target (Pt/Ru ratio is 3/1) is used to form a first surface layer by sputtering. Incidentally, the X is one element selected from the group consisting of Ti, V, Cr, Zr, Hf, Nb, Ta, Mo, and W. Through these steps, a structure is obtained in which a large proportion of the surface contains exposed platinum and ruthenium in a ratio of 3/1 and the second layer and underlying layers are layers of an alloy of platinum, ruthenium, and the element X.

[Fuel Cell]

A fuel cell can be provided which includes any of the solid catalysts as an anode-side electrode catalyst. For producing this fuel cell, known methods can be used.

A specific example is shown briefly. The solid catalyst described above is mixed with and dispersed in a perfluorosulfonic acid resin solution (Nafion solution (trademark)), water, and ethylene glycol. Thereafter, the resultant dispersion is applied to an electrolyte membrane by spraying to thereby produce an anode-side electrode catalyst layer. As the electrolyte membrane may be used a Nafion membrane (trademark).

On the other hand, a cathode-side electrode catalyst layer is produced by mixing a platinum catalyst as a cathode catalyst with a perfluorosulfonic acid resin solution (Nafion solution (trademark)), water, and ethylene glycol to obtain a dispersion and applying the dispersion to the electrolyte membrane by spraying.

The electrolyte membrane coated on both sides respectively with the anode-side electrode catalyst layer and the cathode-side electrode catalyst layer is jointed with an anode gas diffusion layer and a cathode gas diffusion layer to produce a membrane electrode assembly. This membrane electrode assembly is held between an anode gas diffusion layer and a cathode gas diffusion layer. Furthermore, the resultant assembly is held between an anode passage plate and a cathode passage plate. Thus, one power generation unit is completed. Power generation units each produced in this manner are stacked, and an anode current collector and a cathode current collector are disposed on the respective ends to thereby complete a power generation part. This power generation part is provided with a fuel tank, fuel feed pump, air feeder, etc. as auxiliary devices. Thus, a fuel cell can be constituted. Specifically, the electrode assembly shown in the FIG. 2 in JP-A 2007-35489 (KOKAI) is formed and the fuel cell shown in the FIG. 1 therein can be constituted.

The following Examples demonstrate that the "reduction of carbon monoxide poisoning of platinum" is realized by the solid catalysts according to the embodiments of the invention.

EXAMPLE 1

Figure 2:
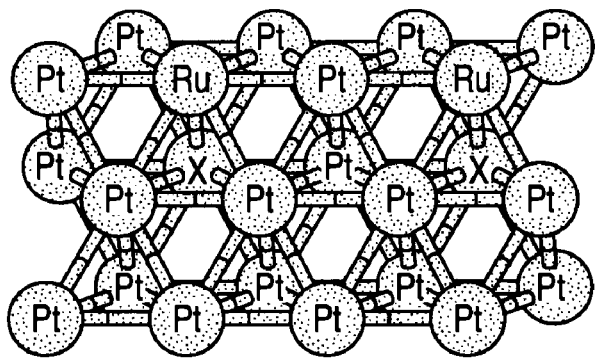
FIG. 2 is a diagrammatic view of a solid catalyst according to the second example of the embodiments of the invention.

In a platinum (Pt) slab, 25 at. % of the platinum present in the second layer from a surface of the slab is replaced by each of additional elements (FIG. 1). The influence of incorporation of the additional elements on reaction activation energy is evaluated.

The elements incorporated are hafnium (Hf), tungsten (W), ruthenium (Ru), and gold (Au). The results of CO oxidation reaction obtained are analyzed and shown in Table 1.

TABLE 1

| Replacement element | Decrease in reaction energy barrier |
|---|---|
| Hf | 19% |
| W | 17% |
| Ru | 5% |
| Au | 3% |

Table 1 shows the decreases in reaction energy barrier in CO oxidation reaction which are caused by the incorporation of the elements. It can be seen from the results that the reaction barrier in the CO oxidation reaction is considerably reduced by incorporating the 4 Group and 6 Group elements in the range of early transition metal elements in the periodic table.

The term "decrease in reaction energy barrier in CO oxidation reaction" herein means a decrease in reaction energy barrier from CO oxidation reaction on the surface of a catalyst wholly containing platinum as a control catalyst. Namely, the reaction energy barrier in the reaction on the catalyst in which each additional element is incorporated in the second surface layer thereof is shown in terms of percentage decrease from that on the control catalyst.

On the other hand, in the case of the late transition metal elements, which has a larger number of d-electrons, and the element in which the d-orbits are completely occupied with electrons, such as gold, a large decrease in reaction energy barrier is not observed.

Those results indicate that the incorporation of the early transition metal elements into the second surface layer of a platinum catalyst accelerates CO oxidation reaction. It is ascertained that there is a possibility that carbon monoxide might be rapidly oxidized.

EXAMPLE 2

With respect to a platinum alloy catalyst having a surface including ruthenium, which is an excellent additional element serving to diminish the poisoning of platinum, an examination is made as to whether the incorporation of another element into a second layer of the catalyst forms a "reaction-accelerating layer".

A platinum (Pt) slab having a surface containing 25 at. % ruthenium is produced, and 25 at. % of the platinum element in a second surface layer of this slab is replaced by each of other elements. The resultant structures (FIG. 2) are evaluated for influence on reaction activation energy.

The elements incorporated are hafnium (Hf), tungsten (W), tantalum (Ta), and ruthenium (Ru). In addition, the incorporation of gold (Au), which shows no reaction-accelerating effect in Example 1 above, is also evaluated as a Comparative Example. The results of CO oxidation reaction obtained are analyzed and shown in Table 2.

TABLE 2

| Replacement element | Decrease in reaction energy barrier |
|---|---|
| Hf | 8% |
| W | 12% |
| Ta | 11% |
| Ru | 6% |
| Au | −2% |

Table 2 shows the decreases in reaction energy barrier in CO oxidation reaction which are caused by the incorporation of the elements; the decreases are shown in terms of percentage decrease from the energy barrier in the reaction on the surface of the platinum alloy catalyst containing 25 at. % ruthenium in the surface.

The term "decrease in reaction energy barrier in CO oxidation reaction" herein means a decrease in reaction energy barrier from CO oxidation reaction on the surface of the platinum alloy catalyst, as a control, having a structure in which the first surface layer contains 25 at. % ruthenium. Namely, the reaction energy barrier in the reaction on the ruthenium-containing platinum alloy catalyst in which each additional element is incorporated in the second surface layer thereof is shown in terms of percentage decrease from that on the control catalyst.

The results indicate that the incorporation of hafnium, tungsten, and tantalum, which are early transition metal elements in the periodic table, considerably reduces the reaction barrier in the CO oxidation reaction. It can be seen that the incorporation of tungsten and tantalum, which are later elements among early transition metal elements, is more effective as different from that in Example 1.

On the other hand, in the case of ruthenium and gold, which each have a larger number of d-electrons, the decreases in reaction barrier are small. It is apparent that the incorporation of gold results in reaction inhibition.

It becomes obvious from those results that even in the case of a platinum alloy catalyst having a surface containing ruthenium, the incorporation of an early transition metal element into the second surface layer of the catalyst accelerates CO oxidation reaction. It is ascertained that a solid catalyst capable of rapidly oxidizing carbon monoxide is obtained.

EXAMPLE 3

With respect to a platinum-ruthenium alloy catalyst containing platinum and ruthenium in a Pt/Ru ratio of 1/1, an examination is made as to whether a "reaction-accelerating layer" is formed by the action of an additional element incorporated in a second surface layer of the catalyst in an amount of 25 at. % after modification of the surface composition of the catalyst into an optimal component ratio.

Figure 3:
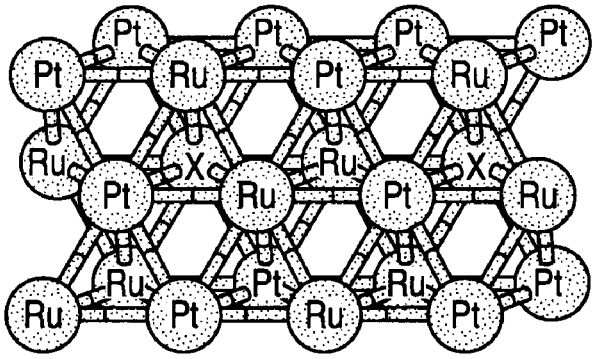
FIG. 3 is a diagrammatic view of a solid catalyst according to the third example of the embodiments of the invention.

A platinum-ruthenium alloy slab formed so as to have a Pt/Ru ratio of 1/1 is modified so as to result in a surface having a surface Pt/Ru ratio of 3/1. This surface is analyzed for barrier in carbon monoxide oxidation reaction on the surface. The platinum-ruthenium alloy slab having that surface component ratio is further modified by incorporating each of hafnium, tantalum, and tungsten, which are elements having a smaller number of valence electrons than platinum, as an additional element X into a second surface layer of the slab in an amount of 25 at. %. The resultant structures (FIG. 3) are evaluated for energy for the stabilization of the $CO_2$ generated by CO oxidation reaction.

The results of the analysis of CO oxidation reaction obtained are shown in Table 3.

TABLE 3

| Replacement element | Ratio of $CO_2$ generation energy increase (Pt—Ru alloy = 1.00) |
|---|---|
| Hf | 1.73 |
| Ta | 1.68 |
| W | 1.59 |

The increases in energy for $CO_2$ generation stabilization in CO oxidation reaction on the platinum alloy catalysts in which the respective elements are incorporated are shown in Table 3 in terms of increase ratio based on the energy for $CO_2$ generation stabilization on the surface of the platinum alloy catalyst containing 25 at. % ruthenium in the surface thereof.

The term "ratio of $CO_2$ generation energy increase" herein means a value concerning $CO_2$ generation in CO oxidation reaction. Namely, that term means an increase in $CO_2$ generation energy from CO oxidation reaction on the surface of the platinum-ruthenium alloy catalyst, as a control, having a structure including a first surface layer having a Pt/Ru ratio of 3/1; the $CO_2$ generation energy in CO oxidation reaction on the platinum-ruthenium alloy catalyst which has the characteristic surface component ratio and in which each additional element is incorporated in the second surface layer thereof is shown in terms of increase ratio based on that on the control catalyst.

It is ascertained from those results that the incorporation of any of hafnium, tantalum, and tungsten, which are early transition metal elements in the periodic table and have a smaller number of valence electrons than platinum, considerably increases the $CO_2$ molecule generation energy on the surface.

It hence becomes obvious that when an alloy which has a surface platinum/ruthenium ratio, Pt/Ru, of 3/1 and in which the second surface layer and underlying layers have a Pt/Ru ratio of 1/1 is modified by incorporating an early transition metal element, which has a smaller number of valence electrons than platinum, into the second surface layer of the platinum alloy catalyst, then CO oxidation reaction is accelerated due to thermodynamic stability. It is ascertained that a solid catalyst capable of rapidly oxidizing carbon monoxide is obtained.

What is claimed is:

1. A solid catalyst having a close-packed structure and having a first surface layer and a second surface layer, the first surface layer comprising platinum as a main component and the second surface layer containing $Pt_aX_b$, wherein X is one element selected from the group consisting of Zr, Hf, Nb, Ta, Mo, and W; a+b=100; and $25 \leq b \leq 50$.

2. The solid catalyst of claim 1, wherein the second surface layer contains hydrogen in a proportion of from 200 at. % to 400 at. % based on the total number of atoms of the platinum.

3. The solid catalyst of claim 1, wherein the first surface layer contains neither molybdenum nor tungsten.

4. A solid catalyst having a close-packed structure and having a first surface layer and a second surface layer, the first surface layer comprising platinum and ruthenium as main components and the second surface layer containing $Pt_aRu_bX_c$, wherein X is one element selected from the group consisting of Zr, Hf, Nb, Ta, Mo, and W; a+b+c=100; and 25≦c≦50.

5. The solid catalyst of claim 4, wherein the second surface layer contains hydrogen in a proportion of from 200 at. % to 400 at. % based on the total number of atoms of the platinum and ruthenium.

6. The solid catalyst of claim 4, wherein the first surface layer contains neither molybdenum nor tungsten.

7. A solid catalyst having a close-packed structure and having a first surface layer and a second surface layer, wherein the first surface layer comprises lattices appearing therein which each contain four atoms of metallic elements and which have a minimum unit containing platinum and ruthenium in a platinum/ruthenium ratio of 3/1, and the second surface layer contains $Pt_aRu_bX_c$, wherein X is one element selected from the group consisting of Ti, V, Cr, Zr, Hf, Nb, Ta, Mo, and W; a+b+c=100; and 25≦c≦50.

8. The solid catalyst of claim 7, wherein the second surface layer contains hydrogen in a proportion of from 200 at. % to 400 at. % based on the total number of atoms of the platinum and ruthenium.

9. The solid catalyst of claim 7, wherein the first surface layer contains neither molybdenum nor tungsten.

* * * * *